United States Patent
Tang et al.

(10) Patent No.: US 9,424,131 B2
(45) Date of Patent: Aug. 23, 2016

(54) SPATIALLY DECOUPLED REDUNDANCY SCHEMES FOR A SOLID STATE DRIVE (SSD)

(71) Applicant: Avago Technologies General IP (Singapore) Pte. Ltd, Singapore (SG)

(72) Inventors: Alex G. Tang, Oakland, CA (US); Leonid Baryudin, San Jose, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 211 days.

(21) Appl. No.: 14/045,102

(22) Filed: Oct. 3, 2013

(65) Prior Publication Data

US 2015/0082124 A1    Mar. 19, 2015

Related U.S. Application Data

(60) Provisional application No. 61/879,752, filed on Sep. 19, 2013.

(51) Int. Cl.
*G11C 29/00* (2006.01)
*G06F 11/10* (2006.01)

(52) U.S. Cl.
CPC .......... *G06F 11/108* (2013.01); *G06F 11/1008* (2013.01); *G06F 11/1012* (2013.01)

(58) Field of Classification Search
CPC .............. G06F 11/1008; G06F 11/108; G06F 11/1076; G06F 11/14; H03M 13/03
USPC ......... 714/766, 773, 769–772, 763, 758, 752, 714/800, 807, 6.24, 49, 52
See application file for complete search history.

(56) References Cited

U.S. PATENT DOCUMENTS

| | | | |
|---|---|---|---|
| 8,656,257 B1 * | 2/2014 | Micheloni et al. | 714/773 |
| 8,694,855 B1 * | 4/2014 | Micheloni et al. | 714/763 |
| 2010/0313099 A1 * | 12/2010 | Yamaga | 714/755 |
| 2012/0278543 A1 | 11/2012 | Yu et al. | 711/103 |
| 2013/0042053 A1 | 2/2013 | Huang | 711/103 |
| 2013/0086454 A1 | 4/2013 | Rub | 714/773 |
| 2013/0159765 A1 | 6/2013 | Hiramatsu et al. | 714/6.1 |
| 2013/0227202 A1 | 8/2013 | Burd | 711/103 |

* cited by examiner

*Primary Examiner* — Christine Tu

(57) ABSTRACT

An apparatus comprising a memory and a controller. The memory may be configured to process a plurality of read/write operations. The memory may comprise a plurality of memory modules each having a size less than a total size of the memory. The controller may be configured to write user data using a redundancy scheme. Information about the redundancy is (i) stored in a location separate from the data and (ii) used to recover potentially corrupted user data.

20 Claims, 5 Drawing Sheets

SPATIALLY DECOUPLED REDUNDANCY SCHEMES FOR A SOLID STATE DRIVE (SSD)

This application relates to U.S. Provisional Application No. 61/879,752, filed Sep. 19, 2013, which is hereby incorporated by reference in its entirety.

FIELD OF THE INVENTION

The invention relates to storage devices generally and, more particularly, to a method and/or apparatus for implementing spatially decoupled redundancy schemes for a solid state drive (SSD).

BACKGROUND

Conventional Solid State Drives (SSDs) have used Redundant Array of Inexpensive Drives (RAID)-like redundancy to provide results similar to conventional hard disk drives (HDDs) to recover from certain types of errors. Such redundancy has typically been implemented as "1 die out of n" so that an entire NAND die is consumed by the redundancy. In an 8 NAND die, one of the NAND die is used for RAID-5-like redundancy, reducing capacity by ⅛th, but providing protection against various types of errors.

One issue with redundancy in a SSD is the overall capacity of the drive. Consumers want as much drive space to be available for data as possible. A SSD is normally manufactured with some type of over provisioning, which is the difference between the actual capacity and the advertized capacity. The over provisioning should be kept as low as possible to maintain competitive prices for each unit of available storage.

It would be desirable to reduce over provisioning when protecting user data using a RAID-like redundancy scheme where redundancy information is stored in a location separate from the user data being protected.

SUMMARY

The invention concerns an apparatus comprising a memory and a controller. The memory may be configured to process a plurality of read/write operations. The memory may comprise a plurality of memory modules each having a size less than a total size of the memory. The controller may be configured to write user data using a redundancy scheme. Information about the redundancy is (i) stored in a location separate from the data and (ii) used to recover potentially corrupted user data.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing spatially decoupled redundancy schemes for a solid state drive (SSD) that may (i) save SSD redundancy information in separate locations (e.g., flash pages) which are allocated dynamically, (ii) use logical block addresses (LBAs) above a target maximum LBA count to save redundancy information, (iii) use an SSD map to store and retrieve locations of redundancy information for each redundancy page (iv) add metadata to the redundancy information, specifying what parts of a redundancy page have been written and contributed to the redundancy information, (v) create a pool of redundancy blocks (RAID Band), different from that used for protected data, to store redundancy information and/or (vi) be easy and/or cost effective to implement.

Figure 1:
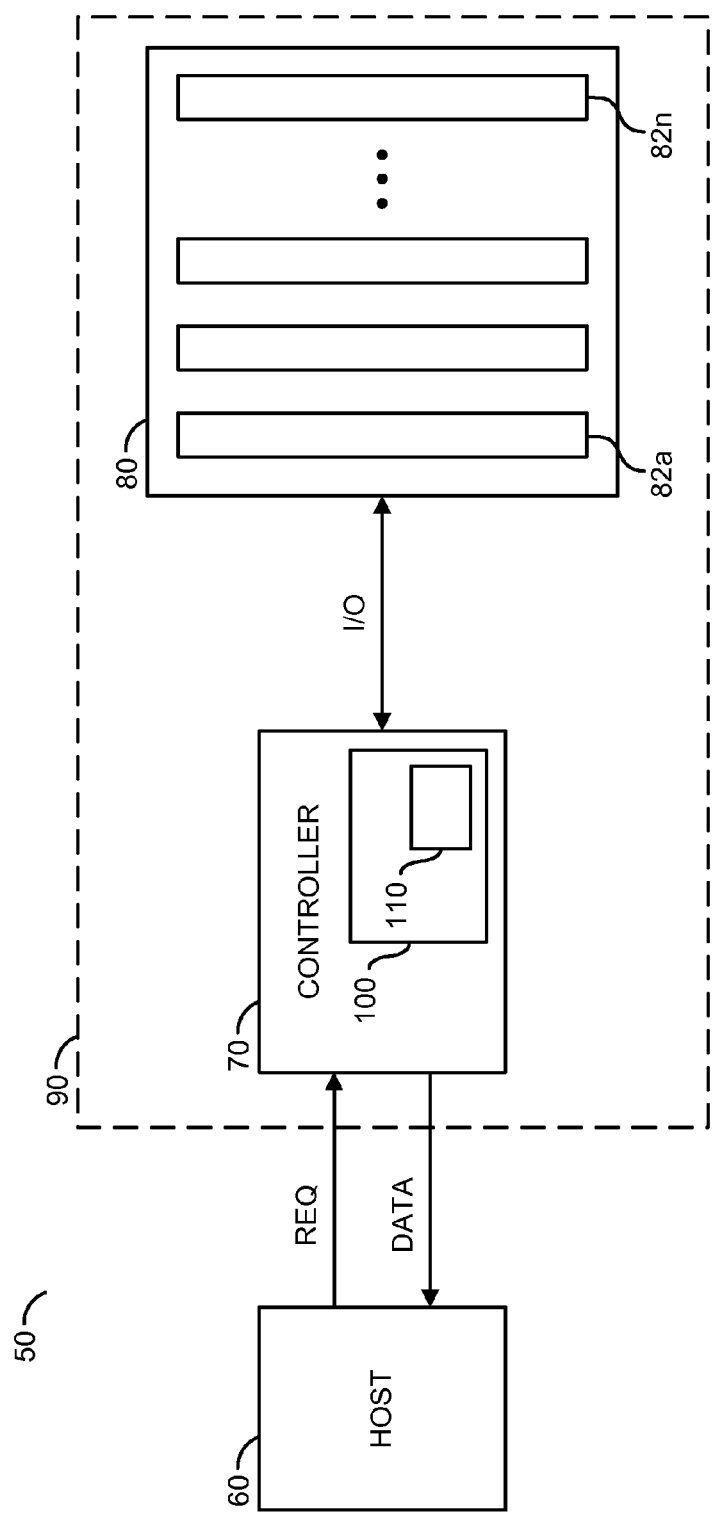
FIG. 1 is a diagram of a context of the invention.

Referring to FIG. 1, a block diagram of an example apparatus 50 is shown. The apparatus 50 generally comprises a block (or circuit) 60, a block (or circuit) 70 and a block (or circuit) 80. The circuit 70 may include a circuit 100. The circuit 100 may be a memory/processor configured to store computer instructions (or firmware) or may be logic. The instructions, when executed, may perform a number of steps. The firmware 100 may include a redundancy control module 110 (to be described in more detail in connection with FIGS. 2 and 3). The redundancy control module 110 may be implemented as part of the firmware 100 or as a separate module. While an example of redundancy implemented in the firmware 100 is shown, the redundancy may be implemented, in another example, in hardware (e.g., logic such as a state machine).

A signal (e.g., REQ) may be generated by the circuit 60. The signal REQ may be received by the circuit 70. The signal REQ may be a request signal that may be used to access data from the circuit 80. A signal (e.g., I/O) may be generated by the circuit 70 to be presented to/from the circuit 80. The signal REQ may include one or more address bits. A signal (e.g., DATA) may be one or more data portions received by the circuit 60.

The circuit 60 is shown implemented as a host circuit. The circuit 70 reads and writes data to and from the circuit 80. The circuit 80 is generally implemented as a nonvolatile memory circuit. The circuit 80 may include a number of modules 82a-82n. The modules 82a-82n may be implemented as NAND flash chips. In some embodiments, the circuit 80 may be a NAND flash device. In other embodiments, the circuit 70 and/or the circuit 80 may be implemented as all or a portion of a solid state drive 90 having one or more nonvolatile devices. The circuit 80 is generally operational to store data in a nonvolatile condition. When data is read from the circuit 80, the circuit 70 may access a set of data (e.g., multiple bits) identified in the signal REQ. The signal REQ may request data from the drive 90 or from one of a number of additional storage devices.

Data within the circuit 80 is generally organized in a hierarchy of units. A first type of redundancy may be implemented as a redundancy block. A redundancy block is a combination of blocks (e.g., a block from each nonvolatile memory die in the circuit 80) that can be combined to form a redundant array of silicon independent elements, similar to a redundant array of independent disks for magnetic media. The nonvolatile memory locations within the blocks may be written in a striped fashion. In some embodiments, organizing a plurality of blocks in redundancy blocks reduces an overhead of block management. A block is generally considered a smallest quantum of erasing. A page is generally considered a smallest quantum of writing. A read unit (or codeword or Epage or ECC-page) is a smallest correctable quantum of reading and/or error correction. Each block includes an integer number of pages. Each page includes an integer number of read units.

In some embodiments, the circuit 80 may be implemented as a single-level cell (e.g., SLC) type circuit. An SLC type circuit generally stores a single bit per memory cell (e.g., a logical 0 or 1). In other embodiments, the circuit 80 may be implemented as a multi-level cell (e.g., MLC) type circuit. An MLC type circuit is generally capable of storing multiple (e.g., two) bits per memory cell (e.g., logical 00, 01, 10 or 11). In still other embodiments, the circuit 80 may implement a triple-level cell (e.g., TLC) type circuit. A TLC circuit may be able to store multiple (e.g., three) bits per memory cell (e.g., a logical 000, 001, 010, 011, 100, 101, 110 or 111).

In general, the controller 70 may include an erase/program unit that may implement redundancy across the modules 82a-82n. For example, multiple blocks may be read from multiple dies 82a-82n. The erase/program unit may be implemented as part of the firmware (or logic) 100.

The drive 90 may contain, in one example, multiple NAND Flash or memory modules 82a-82n. Each of the memory modules may be fabricated as one or more dies (e.g., 1, 2, 4, 8, etc.). The dies (or modules) 82a-82n may operate to read or to write concurrently. The read and write bandwidth depends on how many of the dies 82a-82n are implemented, as well as the bandwidth of each of the dies 82a-82n. If the SSD drive 90 receives the host command REQ, in order to achieve the best performance, and/or to address wear leveling issues, the drive 90 will walk through all of the dies 82a-82n (e.g., a first page of DIE0, DIE1 . . . DIEn, then a next page of DIE0).

Redundancy is used for higher-level error correction. When writing pages in each of the NAND dies 82a-82n, a first-level error-correcting code (such as a BCH or LDPC code) is used to protect the data within the individual pages. The redundancy may be implemented as orthogonal, second level of redundancy applied across a number of pages (generally from a different one of the NAND die 82a-82n) to permit recovery from various error conditions.

Errors may include a page that is uncorrectable because of too many accumulated errors for the first-level error-correcting code to correct. For example, a word line in one of the dies 82a-82n may fail, rendering a portion of the data in that die, such as a page, inaccessible. In another example, a block in one of the dies 82a-82n may fail, rendering the data in the failed block inaccessible. If an entire one of the dies 82a-82n fails, all of the data in the die is considered inaccessible. Except for the first type of error, the other failure types above are considered physical failure mechanisms, and are generally hard (or persistent) errors.

In some embodiments, the redundancy may use an error-correcting code. In other embodiments, the redundancy uses an erasure-correcting code since a location of the error(s) is known (e.g., the pages or portions thereof that failed to be corrected by the first-level error correcting code). For example, a simple parity (XOR) code can correct 1 erasure using 1 redundant position out of n. Reed-Solomon (RS) codes can be used to correct erasures, and an RS code using j redundant positions out of n can correct j erasures. Other erasure correcting techniques, such as those described in co-pending international application WO2012/099937, filed Jul. 26, 2012, entitled "HIGHER-LEVEL REDUNDANCY INFORMATION COMPUTATION", may be implemented and are incorporated by reference.

The SSD 96 may implement RAID-like redundancy for similar reasons as hard disc drives (HDDs) (e.g., to recover from certain types of errors). The flash dies 82a-82n may be used as part of a redundant array (e.g., similar to a redundant array of independent discs (RAID)). The redundancy used in the SSD 50 may be similar to a HDD RAID. A traditional RAID uses redundancy schemes which can be called "Spatially Coupled" in a sense that the locations of redundancy information (parity) on the media is predetermined by the location(s) of data over which the redundancy is calculated (e.g., RAID Strip).

Such spatial coupling does not represent a significant restriction for a traditional RAID, commonly used on HDDs, which is a magnetic media that can be overwritten in place. Parts of a RAID strip can be written at different times, redundancy information for the strip will be updated on demand.

The flash media 82a-82n operates differently than a HDD media. The flash media 82a-82n can normally be written only once and cannot be overwritten (or modified) before an entire block must be erased. Therefore, in a SSD 90 implementing a redundancy scheme, the entire RAID strip is written sequentially (with redundancy information saved at the very end) which could potentially have a negative effect on flash block management efficiency, write amplification and/or drive longevity. Until a RAID strip is fully written (which can take some time), the RAID strip data is vulnerable and not generally protected by any redundancy at all.

The controller 70 may implement a redundancy scheme for the SSD 90 where location(s) of protected data and redundancy information are "decoupled". The redundancy information can be updated multiple times. Each time redundancy information is updated, a physical location of the redundancy information will change. The physical location of the redundancy information may be saved in a structure (e.g., a MAP), which is used by the SSD 70 to tie logical block addresses (LBAS) with physical locations on the flash media. The SSD 90 may allow block management to benefit from the decoupling to provide better drive performance and/or longevity.

In many embodiments of the SSD 90 without the invention, redundancy is implemented on a flash page basis (either single or multi plane). A failing of an individual flash page can be recovered. A RAID strip becomes a RAID page (e.g., a plurality of pages with the same Page ID and/or Block ID from different dies). Tying the redundancy information location (flash page) to the protected data ("Spatial Coupled RAID") produces difficulties when applied to flash media (SSD) that is not found in a traditional RAID in a HDD (using magnetic media). Namely, the entire RAID Page (with all of the underlying flash pages) should be written before the redundancy information of flash page can be saved. Before the write, data in a RAID page is not protected at all. In a NAND flash, only full blocks (and not individual pages) could be erased. The entire RAID block which is a collection of all RAID pages with the same block ID, becomes an SSD block management unit.

In implementations without the invention, the number of RAID blocks is equal to the number of blocks in the flash part being used (e.g., 512, 1024 or 2048). These numbers are rather big to ensure that a block chosen for garbage collection is a good candidate (e.g., has a least used space).

However, in other embodiments without the invention, (e.g., a so-called "Fractional RASIE", described in co-pending application Ser. No. 13/675,874, which is incorporated by reference), the size of a RAID page and a RAID block can grow significantly at the expense of the number of redundancy blocks. With a redundancy fraction ratio of 8, 512 R-blocks become just 64, making garbage collection very inefficient.

In many embodiments without the invention, the SSD 90 contains multiple flash dies 82a-82n. To achieve maximal write and read performance, access may be made to several (ideally all) of dies 82a-82n in parallel. The physical addressing in the SSD 90 is arranged so that the "next flash page" is the page with the same Page ID/Block ID on the one of the next die 82a-82n, not next page on the same one of the dies 82a-82n. The SSD controller 70 can keep all of the dies 82a-82n busy most of the time. Such an approach is known as "striping" data across multiple dies.

Figure 2:
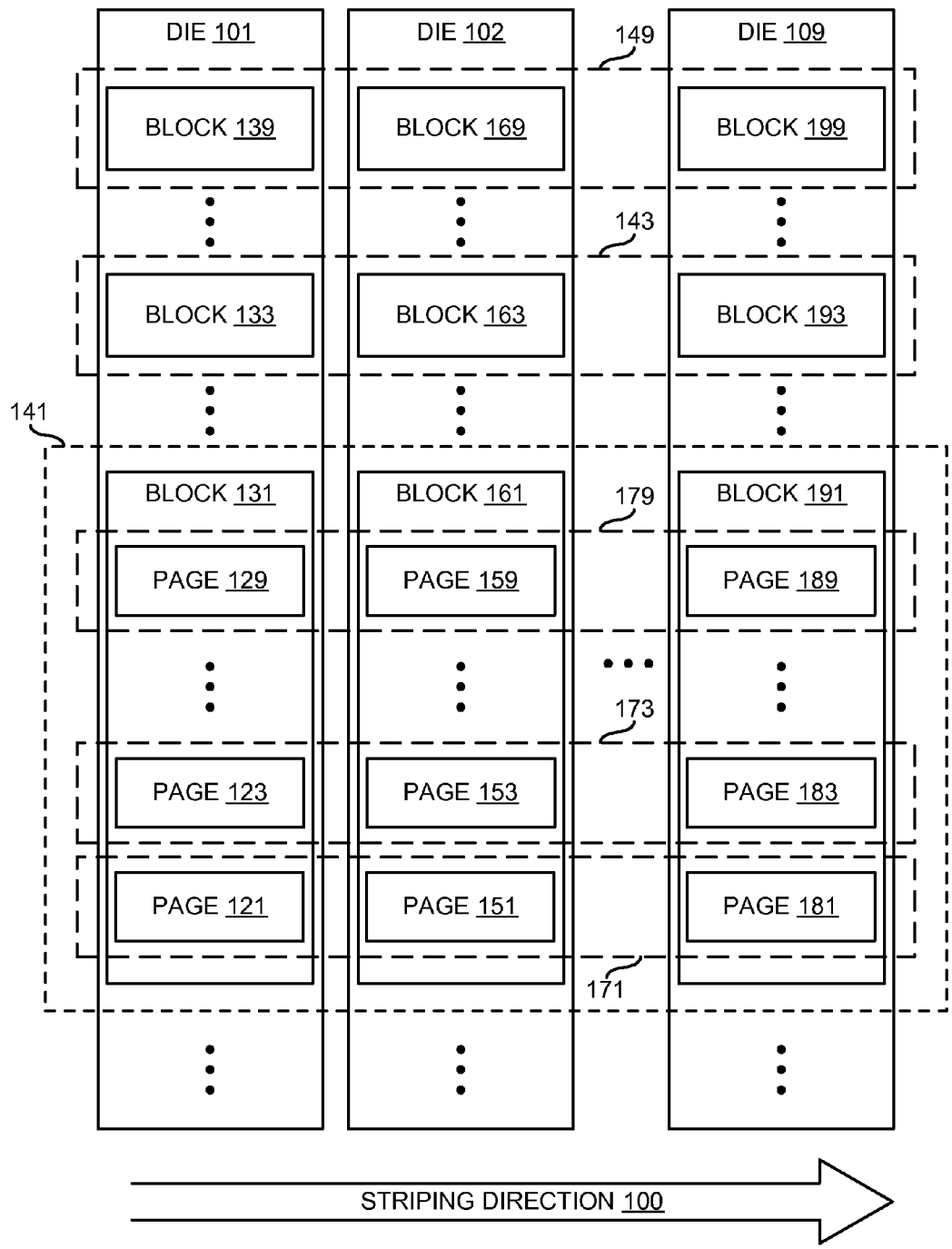
FIG. 2 is a diagram of a redundancy scheme.

Referring to FIG. 2, a diagram of the dies 101-109 (number of dies can be any number, typically 2-128) is shown implemented in a "striped" fashion. The die 101 is shown having a number of blocks 131-139. The die 102 is shown having a number of blocks 161-169. Similarly, the die 109 is shown having a number of blocks 191-199. The particular number of blocks in each of the dies 101-109 may be varied depending on the particular flash part being implemented.

The block 131 is shown having a number of pages 121-129. Similarly, the block 161 is shown having a number of pages 151-159. The block 141 is shown having a number of pages 181-189. The particular number of pages in each of the blocks may be varied depending on the particular flash part being implemented.

A number of "stripes" (or Super Pages or simply S-Pages 171-179) are shown. The S-Page 171 is shown comprising the pages 121, 151 and 181. The S-Page 173 is shown comprising the pages 123, 153 and 183. The S-Page 179 is shown comprising the pages 129, 159 and 189.

Individual pages from each of the NAND dies 101-109 in the S-pages 171-179 are written in a determined order (e.g., 121→151→181 in the S-Page 171, etc.), wrapping around to write the next S-Page, until one block of each of the NAND dies 101-109 is full.

A number of S-Blocks 141-149 are shown. The S-Block 141 is shown comprising the blocks 131, 161 and 191. The S-Block 143 is shown comprising the pages 133, 163 and 193. The S-Block 149 is shown comprising the pages 139, 169 and 199. The writing order shown has been applied in a "die first, page second, block third" order that fills one block from each of the dies 101-109 before storing data into a second block in each of the dies 101-109. Logical Pages (e.g., a L-Page) may also be implemented.

While pieces of data are being written sequentially in physical space, the addresses (from the perspective of the host 60 (e.g., Logical Base Address or LBA)) can be arbitrary, sequential or random. For example, the host 60 sends a request to write N sectors (a typical sector size is 512-4096 bytes), starting from LBA=X. This data is placed into the S-Pages with a location and length stored in the SSD MAP (to be described in more detail in connection with FIG. 3) for later usage (when data will be read).

In many embodiments, the SSD 90 does not operate on an individual sector basis. Rather, Logical Pages (L-Pages) (typically containing 8-16 sectors and being typically 4096-16384 bytes of size) are implemented. An L-Page can reside completely inside a flash page, or start in one flash page and end in another (e.g., cross flash page boundaries). Several L-Pages can share the same flash page.

Figure 3:
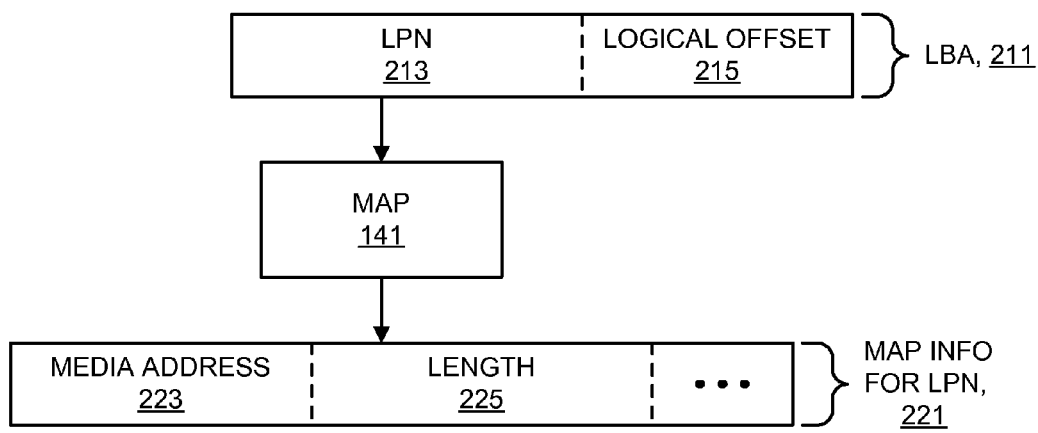
FIG. 3 is a diagram of a page mapping.

Referring to FIG. 3, an example of an L-Page mapping is shown. In the example shown, each L-Page is determined by a L-Page number (e.g., LPN 213) which is calculated as LBA of the first sector in the L-Page, divided by the number of sectors per L-Page. Each LBA 211 can be found inside the correspondent L-Page at a certain logical offset 215. A map 141 is shown storing map information for each LPN 213, containing a Media Address 223 of the L-Page and a length parameter 225. The map 141 may be any structure configured to store data used to maintain a map between logical addresses known to the host 60 and physical locations on the media 82a-82n.

External and/or internal L-Pages may be implemented. In many embodiments, some of the L-Pages (corresponding to LBAs which are not used by the host 60) can be used by the controller firmware 110 to save internal data (e.g., debug logs, etc.). Such LBAs are located above a value MAX_LBAS (representing the maximum LBA the host 60 can use). Such LBAs are called Internal L-Pages (in contrast with External L-Pages that the host 60 can directly access through I/O operations). The Internal L-Pages are "normal" L-Pages and essentially mapped the same way as other L-Pages (although the host 60 does not access the L-pages through normal I/O operations).

Figure 4:
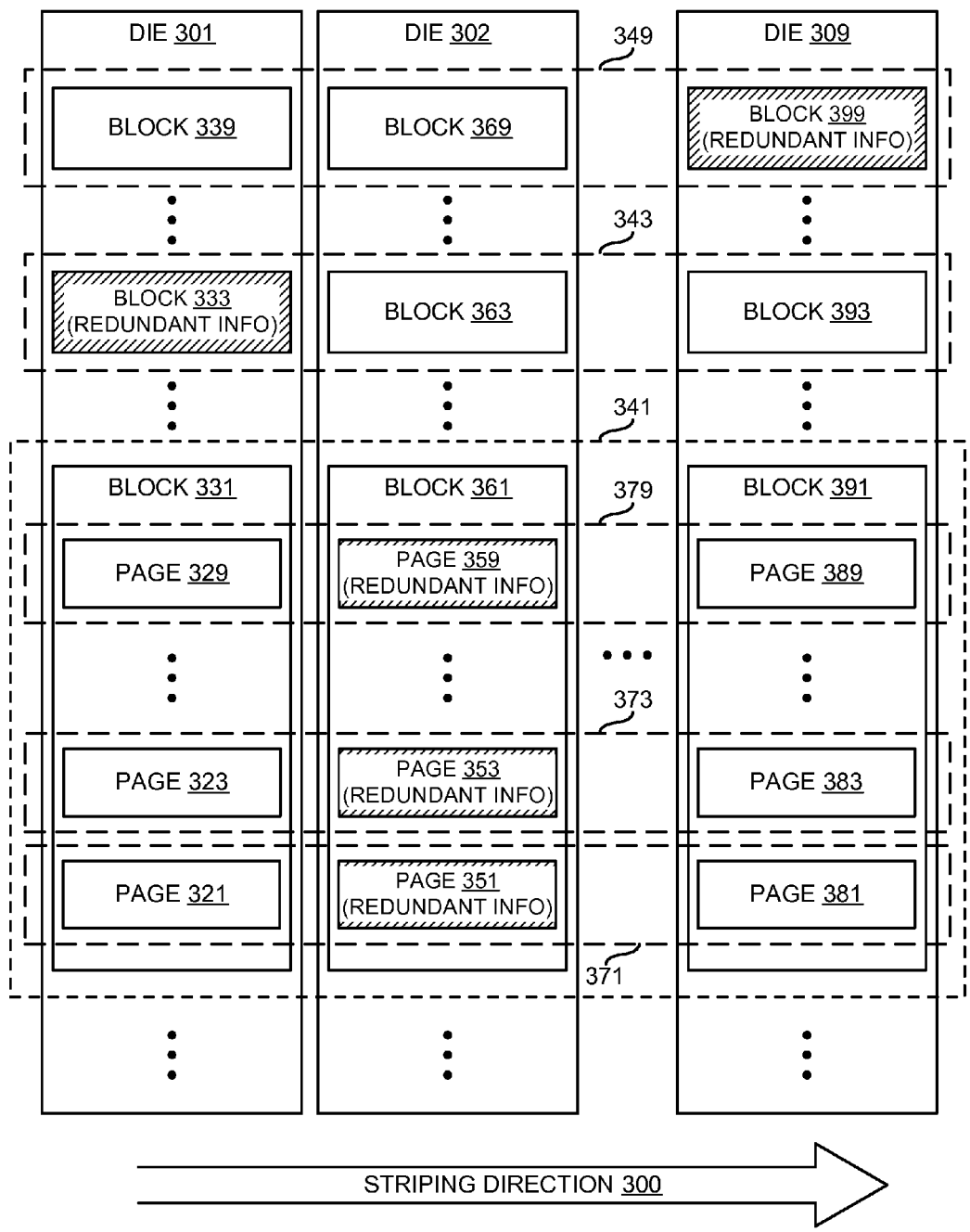
FIG. 4 is a diagram of a redundancy scheme.

Referring to FIG. 4, an example of a normal redundancy is shown. A normal redundancy occurs when writing pages in each of the NAND dies 82a-82n. A redundancy may be applied by writing data in a "striped" fashion. One page from each Super Page (S-Page) is shown dedicated for redundancy information. A Super Page may become a RAID Strip or RAID Page (R-Page). A Super Block may become a RAID Block (R-Block).

Redundant information can be in a physically different die for each R-Block but may have a location that is predetermined and/or logically coupled with protected data location(s). Because a conventional striping order fills an entire block in each of the dies 82a-82n before writing to a second block in each die, block failures in a conventional redundancy can only be handled with a full die of redundancy (e.g., 1 die out of n dedicated to storing the redundancy overhead). Or equivalently, 1/nth of the capacity distributed among the dies.

An inherent limitation with using 1 die out of n (or the equivalent in capacity distributed among the dies) to store redundancy information for recovery of block failures is that the overhead is 1/n. In a small-capacity SSD where n is small, the overhead becomes a higher percentage of the capacity, driving Up/Over Provisioning. Another problem with conventional approaches is that the amount of data in uncompleted (and therefore unprotected) R-Pages grows with R-Page size. Smaller capacity drives are less sensitive to die failures—they have fewer dies—and a new striping order can be used to protect against non-die physical failures without using excessive overhead.

Embodiments of the invention decouple redundant information location(s) from that of protected data. Namely, redundant information will be mapped to the special range of Internal L-Pages above the value MAX_LBAS. These mapped L-Pages may be referred to as Redundancy Info L-Pages (RIL-Pages).

Redundancy information tends to be rewritten multiple times even before an entire R-Page is completed. For each rewrite, a new location will be saved in the map 141. The individual S-Pages (and even flash pages) belonging to the same R-Page can be independently written. If the drive 90 encounters an error, redundancy information for any incomplete S-Page/R-Page can still be accessed.

Figure 5:
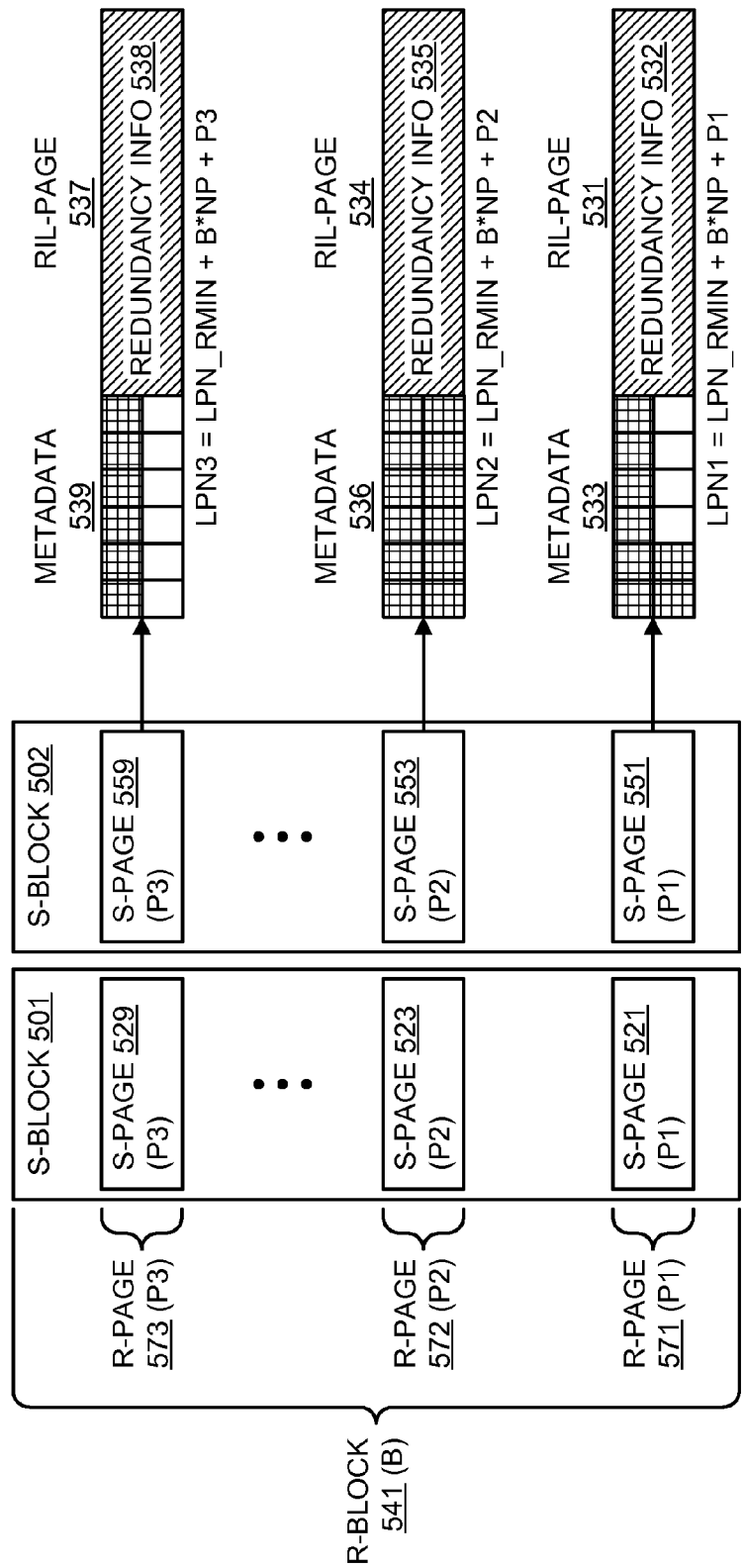
FIG. 5 is a diagram illustrating metadata used to implement the redundancy scheme.

Referring to the FIG. 5, a diagram of an R-Block 541 (shown as the letter B) is shown having a number of S-Blocks 501-502. The particular number of S-Blocks in each R-Block may be varied to meet the design criteria of a particular Fractional or Normal redundancy implementation. The RIL-Pages besides redundancy information contain special metadata (bitmap), specifying what pages actually contribute to the redundancy info. This is necessary for later redundancy in a case where only part of the R-Page flash pages actually contributed to the redundancy.

In some embodiments, the RIL-Page LPN for R-Page P R-Block B may be calculated using the following Equation EQ1:

$$LPN = LPN\_RMIN + B*nP + P \qquad \text{EQ1}$$

Where nP is number of pages per block, LPN-RMIN>MAX_LBAS.

The S-Block 501 is shown having a number of S-Pages 521-529. Similarly, the S-Block 502 is shown having a number of pages 551-559. The particular number of S-Pages in each of the S-Blocks may be different depending on the flash part being used. The R-Page 571 is shown having S-Pages 521 and 551. The R-Page 572 is shown having the S-Pages 523 and 553. The R-Page 573 is shown having S-Pages 529 and 559. An RIL-Page with a known LPN corresponds to each R-Page.

As S-Pages are being written, the new input adds to the RIL-Page of the particular R-Page. Similarly, when a particular S-Block is being erased, the corresponding S-Pages are "subtracted" from the correspondent RIL-Pages 531-537. Metadata in RIL-Page reflects the individual pages that are actually included. The RIL-Page 531 normally has input from the full S-Page 521 and/or part of the S-Page 551. The RIL-Page 534 normally has a full R-Page 572 input. The RIL-Page 537 normally has M of R-Page 573 (S-Page 529) being included.

The following procedures may be used to implement the decoupled redundancy:
1) Each time an S-Page is written and redundancy data is accumulated:
   a. Read RIL-Page for this strip (see LPN formula above).
   b. Add the just accumulated redundancy data to the data read from the media.
     i. If this is first time (RIL-Page trimmed/do not exist/all metadata bits are 0), use the just accumulated page.
   c. Update metadata and setting bits corresponding to this S-Block.
   d. Write results back to the media.
2) Each time S-Page is recycled:
   a. Calculate the redundancy data for this S-Page.
   b. Read RIL-Page for this strip (see equation EQ1).
   c. Subtract the just calculated redundancy page from the data read from the media.
   d. Update metadata and clearing bit corresponding to this S-Block.
   e. Write results back to the media.

The RIL-Pages normally reside anywhere on the various media 82a-82n because the location will be saved in the map 141. However, the RIL-pages normally do not share the same blocks with protected data (since a block failure cannot be recovered). The RIL-Pages are normally written into a separate pool of S-Blocks (band) that is different from the pool used to store user data. A normal (spatially coupled) redundancy scheme may be used on this band if any redundancy is required at all.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a non-volatile memory configured to process a plurality of read/write operations, said non-volatile memory comprising a plurality of memory modules each having a size less than a total size of said non-volatile memory; and
a controller configured to write user data and corresponding redundancy data using a data striping redundancy scheme, separate a first memory location comprising the user data and a second memory location comprising the redundancy data by mapping the user data to external logical block addresses (LBAs) and the redundancy data to internal LBAs, and use the redundancy data to recover potentially corrupted user data.

2. The apparatus according to claim 1, wherein said first memory location is on a first memory module, said second memory location is on a second memory module, and said second memory module is separate from said first memory module.

3. The apparatus according to claim 1, wherein a map mapping said external LBAs and said internal LBAs to physical memory is updated each time said user data and said redundancy data are written.

4. The apparatus according to claim 3, wherein said apparatus comprises a Solid State Drive (SSD), and wherein a physical location of the map within the SSD changes each time the map is updated.

5. The apparatus according to claim 3, wherein said redundancy data includes redundancy information and metadata, said redundancy information protecting said user data, said metadata specifying a set of blocks written according to a data stripe (S-block) and associated with the redundancy information.

6. The apparatus according to claim 5, wherein said map includes a physical address and a length corresponding to the set of blocks, wherein said metadata includes bitmap data indicating one or more pages contributing to said redundancy information, and wherein said one or more pages comprise logical page (L-page) data.

7. The apparatus according to claim 6, wherein a logical page (L-page) of the L-page data can reside completely inside a page or start in one page and end in another page.

8. The apparatus according to claim 1, wherein said redundancy data is calculated after each new write.

9. The apparatus according to claim 1, wherein said redundancy scheme is implemented with over-provisioning capacity available on a portion of a memory module of the plurality of memory modules that is accessible by said controller using said internal LBAs, said internal LBAs being outside a range of said external LBAs, said external LBAs being used by a host for normal input/output (I/O) operations.

10. The apparatus according to claim 9, wherein said plurality of memory modules comprises NAND flash modules, and wherein said over-provisioning capacity is used to store said redundancy data.

11. The apparatus according to claim 1, wherein said external LBAs or said internal LBAs comprise a logical page number (LPN) and a logical offset.

12. A method for decoupling redundancy data from user data in a storage device, comprising the steps of:
processing a plurality of read/write operations in a non-volatile memory comprising a plurality of memory modules each having a size less than a total size of said non-volatile memory;
writing user data and redundancy data corresponding to said user data using a data striping redundancy scheme;

separating said user data and said redundancy data using external logical block addresses (LBAs) for said user data and internal LBAs for said redundancy data, wherein said redundancy data is (i) stored in a first location of said non-volatile memory separate from a second location of said non-volatile memory used to store said user data and (ii) used to recover potentially corrupted user data.

13. The method according to claim 12, wherein said first location is a map location on a first memory module, said second location is on a second memory module, said first memory module is separate from said second memory module.

14. The method according to claim 13, wherein said map location is updated each time said user data is written.

15. The method according to claim 14, wherein updating said map location each time said user data is written comprises storing mapping information about said redundancy data to a new map location within a Solid State Drive (SSD).

16. The method according to claim 14, wherein each time said map location is updated a physical location of said redundancy data will change.

17. An apparatus comprising:
a non-volatile memory; and
a controller in communication with a host, said controller configured to:
implement a plurality of data writes, said plurality of data writes including a user data write to write user data received from the host and a redundant data write to write redundant data to protect said user data, wherein at least said user data write includes a data striping write, wherein the plurality of data writes are implemented using a multi-level redundancy scheme, wherein at least one redundancy level of said multi-level redundancy scheme separates the user data from the redundant data using external logical block addresses (LBAs) for the user data and internal LBAs for the redundancy data.

18. The apparatus according to claim 17, wherein said redundancy data is useable to recover potentially corrupted user data and includes a bitmap to indicate a portion of user data contributing to said redundant data, and wherein a second redundancy level of the multi-level redundancy scheme includes an error-correcting code.

19. The apparatus according to claim 17, wherein the at least one redundancy level of the multi-level redundancy scheme protects data within a page using erasure-correction code and a second redundancy level of the multi-level redundancy scheme protects the block or the page using error-correction code.

20. The apparatus according to claim 17, wherein said redundant data is stored to a mapped location physically separate and independent of a location used to store said user data, said mapped location is accessed using said internal LBAs, said internal LBAs being outside a range of the external LBAs.

* * * * *